Dec. 6, 1960  O. A. WHEELON  2,962,994
HIGH-PRESSURE HYDRAULIC PRESS
Filed Oct. 22, 1953  9 Sheets-Sheet 1

INVENTOR.
ORVILLE A. WHEELON
BY
Edwin Coates
- ATTORNEY -

Dec. 6, 1960   O. A. WHEELON   2,962,994
HIGH-PRESSURE HYDRAULIC PRESS
Filed Oct. 22, 1953   9 Sheets-Sheet 3

INVENTOR.
ORVILLE A. WHEELON
BY
   Edwin Coates
   -ATTORNEY-

Dec. 6, 1960 O. A. WHEELON 2,962,994
HIGH-PRESSURE HYDRAULIC PRESS
Filed Oct. 22, 1953 9 Sheets-Sheet 5

INVENTOR.
ORVILLE A. WHEELON
BY
Edwin Coates
ATTORNEY

Dec. 6, 1960 O. A. WHEELON 2,962,994
HIGH-PRESSURE HYDRAULIC PRESS
Filed Oct. 22, 1953 9 Sheets-Sheet 6

INVENTOR.
ORVILLE A. WHEELON
BY
Edwin Coates
-ATTORNEY-

Dec. 6, 1960 O. A. WHEELON 2,962,994
HIGH-PRESSURE HYDRAULIC PRESS
Filed Oct. 22, 1953 9 Sheets-Sheet 7
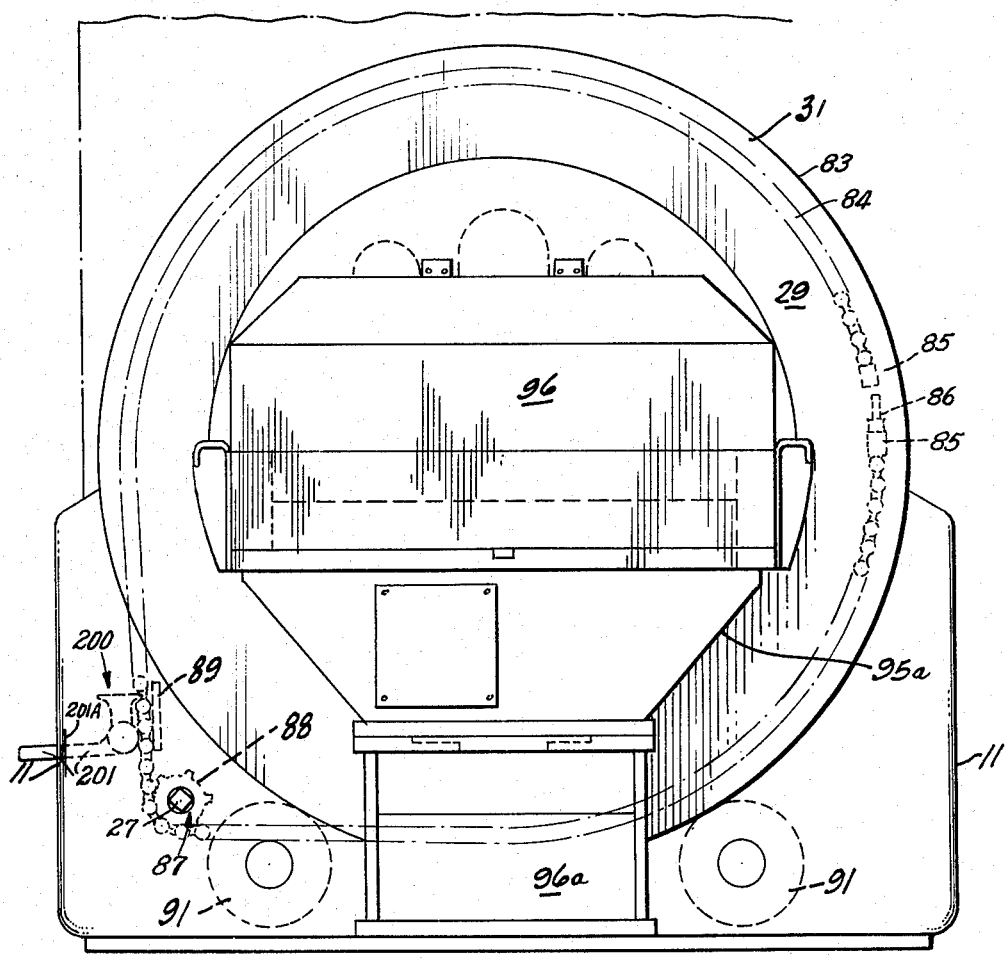
Fig. 7
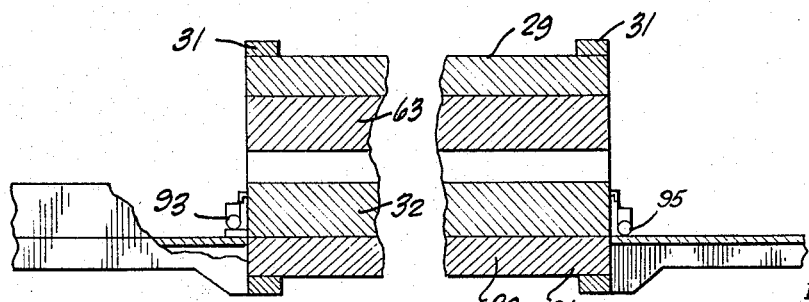
Fig. 8
INVENTOR.
ORVILLE A. WHEELON
BY
ATTORNEY

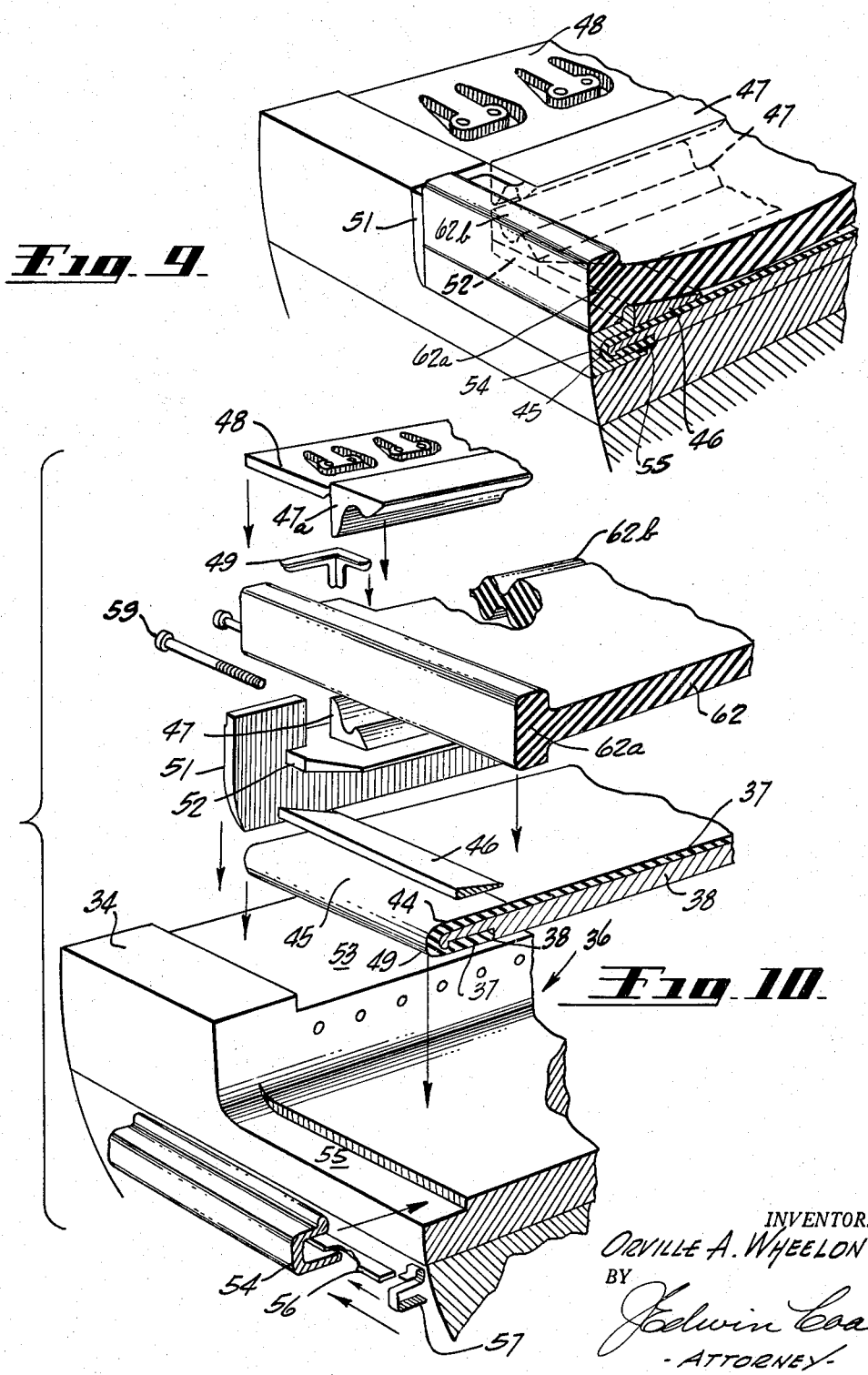

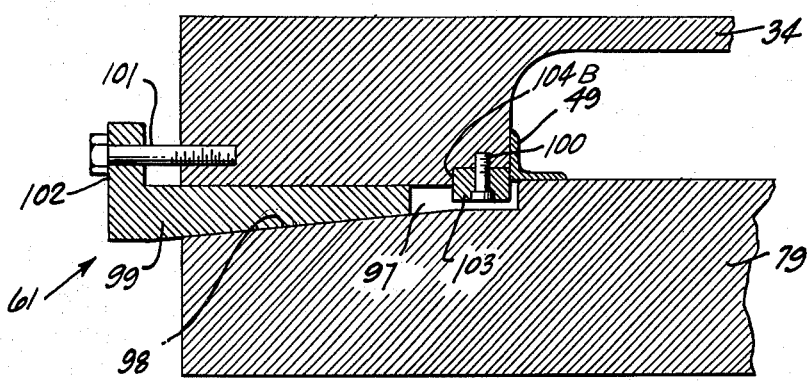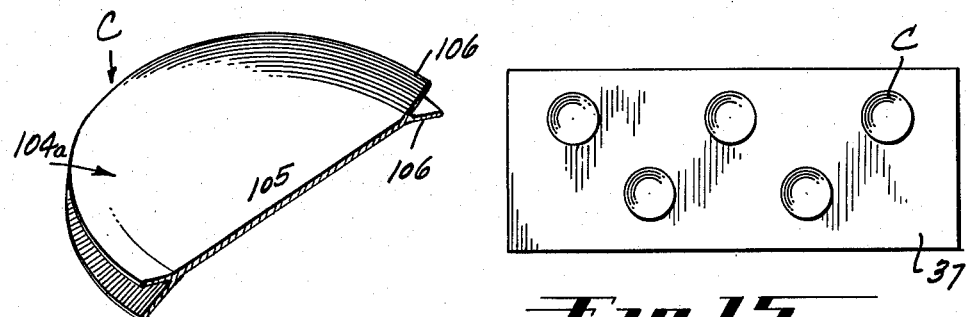

United States Patent Office 2,962,994
Patented Dec. 6, 1960

2,962,994

HIGH-PRESSURE HYDRAULIC PRESS

Orville A. Wheelon, Pacific Palisades, Calif., assignor to Douglas Aircraft Company, Inc., Santa Monica, Calif.

Filed Oct. 22, 1953, Ser. No. 387,741

6 Claims. (Cl. 113—44)

This invention relates to high pressure hydraulic presses of the so-called "diaphragm" type and employed for forming, or contouring, sheet-material, particularly sheet metal.

More specifically, the invention provides certain improvements to the press disclosed in my co-pending application, Serial No. 275,893, filed March 11, 1952, entitled "High-Pressure Hydraulic Press," and now Patent No. 2,771,850. That press, in one of its forms, essentially comprises a pair of semi-cylindrical chamber bounding bodies arranged coaxially in radial separation to define a working chamber, the one of said bodies carrying the diaphragm and the actuating means therefor on its inner face forming the one surface of the working chamber. The other body is adapted to support the work in operative adjacency to the diaphragm. Hereinafter, the diaphragm is designated the "pad" and the actuator therefor is designated the "bag." These parts are encased in a stress-absorbing cylindrical shell which takes care of substantially all the forces generated during the working of the apparatus and including the hoop tensions in particular.

Although the aforesaid press is quite satisfactory within the limits of its objectives, the present invention provides certain improvements thereover first among which may be mentioned that of augmenting the capacity and power of the press and the range of material which can be formed thereby by improving the nature and increasing the volume of the working chamber of the press. Briefly, the parts enclosed by the shell are herein so configured as to increase the height and width of the pad, bag and chamber substantively over that of the previous press of the same body-diameter.

As a consequence, the new press, incorporating a bag and pad of considerably greater width and depth, therefore can be provided with greater power and work at higher pressures. It hence can form sheet material of greater width, thickness and hardness.

Other advantageous consequences of this re-configuration of the parts defining the working chamber will be made manifest hereinafter.

In furtherance of the objective of augmenting the volume of the working chamber and, dually, to enable enhancing the sealing of the press against extrusion therefrom of the relatively soft-material of the diaphragm and its actuator, the upper body of the present press is divided radially into a roof casting, or radial-space filler, and a roof plate mounted facewise to the inner face of the casting. The casting serves primarily to radially fill the space between the roof plate and the shell while taking the longitudinal and circumferential working-stresses, whereas the plate seats the bag and pad therein radially outside the true working chamber. Improved anti-extrusion barriers are provided in the receptacle for the bag and pad, these barrier means being so shaped and disposed at the ends and sides of the bag and pad as to effectively block extrusion thereof at all working pressures contemplated by the invention and ordinarily of the value of 7500 p.s.i.

Because of the discrete mounting of the bag and pad in the separate roof plate, they and the plate may be removed as a unit after the upper body has been withdrawn from the shell and the unit being light as compared to the previous unit consisting of the solid one half of the working chamber-bounding bodies with the bag and pad fixed to it, can be readily removed from the roof casting and transported to a remote point for repair, etc.

In furtherance of its objective of reducing extrusion of the bag and pad edges even below that occurring in my previous press, the invention provides novel and special mechanical barrier members and novel configurations thereof with the bag and pad, all being disposed in a novel manner in the concavity or receptacle in the roof plate. Some of these members, as later particularized, cooperate with the ends of the bag and pad; some co-act with the corners of the oblong bag and pad, and the others cooperate with the sides of the bag and pad. They all go along with the roof plate-unit when the latter is removed so that maintenance and replacement thereof is facilitated.

The receptacle for the bag and pad terminates short of the opposite ends of the oblong roof plate, leaving end walls in the plate which would be subjected to excessive radial bending moments when the bag and pad pressurally elongate longitudinally. If sufficiently high bag-pressures are employed, these moments may be such as to break off these end walls, among other things allowing the bag and pad to forcefully emerge from the press at high velocity.

This invention provides means for precluding this occurrence and in one form these means consist of concavities, or "reliefs" located in the oblong inner face of the roof casting itself and lying at each of the opposite end-portions of the casting. They have a width, transversely of the casting, equal to that of the sub-adjacent roof plate and a length sufficient to be coextensive with the strained region at the jointure of each of the plate's end-walls with the plate's base. These reliefs are provided to eliminate any fulcrum that could enable a rupturing reaction on the "plate" in the region of the juncture of the end wall of the roof plate with the flat body of the roof plate. This fulcrum, provided by the then planar roof-casting, heretofore allowed the unbalanced end-thrust of the bag to exert a bending moment on the juncture of this end wall with the flat body of the roof-plate by virtue of the thrust having a "rigid" fulcrum provided thereat by the abutting lower face of the roof-casting and around which fulcrum this thrust acted to set up an outwardly acting "turning" moment on the "depending" end wall, tending to break off this end wall. By eliminating this abutting surface of the roof casting in this area that constituted a fulcrum and providing thereat a gap or relief, the fulcrum-reaction is eliminated. In fact, instead of being rigidly held immobile, as heretofore, by the lower surface of the roof-casting, now this relatively thin juncture-region of the flat, horizontal portion of the roof-plate with the end wall is unrestrained in the area of this relief, and this thin portion of the roof-plate naturally, under turning moment acting in the end wall, and by virtue of the presence of the relief, tends to buckle up sinusoidally into the relief. This buckling movement of this area of the roof-plate provides a counter-moment to the radial bending effect on the plate's end wall of the bag's end thrust. As stated, therefore, the net function of this relief is that it eliminates the "fulcrum" for these bending moments previously existing in the unrelieved roof casting's inner surface and then bearing on the roof plate in this region. Thus, the radial-moment is transformed into a mere slight upward local displacement of the roof-plate in the relief region.

Although the roof-plate, as well as the roof-casting, may be fixedly mounted to the interior major surface of the shell, as by bolting same thereto, "side rails," as in my previous press, are employed to key-in the platens to the shell and the separate roof plate rests on these side rails. Also, since the roof plate and roof casting are separate and rather elongate, the ends of all these rather loosely contacting members will have a certain amount of relative lost motion or play. Under the high forces generated in the operation of the press, these ends will work up and down to a detrimental extent and among the consequences may be mentioned the facts that excessive strains and force-unbalance may be set up thereby on the entire press; and the faying surfaces will undergo undue wear and abrasions.

By pre-stressing the roof-plate apart from the side rails and thus pre-stressing the press-body in the radial direction, and to the maximum amount of stress it is expected that the press body will be subjected to in the operation of the press, this lost motion and play are obviated and parts concerned are stabilized and relieved of these unbalanced forces.

As a consequence, the service life of some of the principal components of the press is prolonged and the operation of the press is rendered more efficient.

One of the presently contemplated means for achieving this objective may consist of an "inclined plane" unit, or pair of wedges, located at each of the ends of the press- and operatively interposed in a radial gap between the roof-plate and the side rails and also extending longitudinally of these members. Means may be provided for varying the wedging effect of these units and consequently, the amount of radial pre-stressing of the chamber-defining components in accordance with the anticipated maximum operating pressure of the press.

In presses of the largest sizes, it may require a considerable expenditure of extraneous power to effectuate the movements of the twin-platens into and out of the working chamber resting on the inner, planar face of the floor casting because of the rather small finite clearance necessarily maintained between the longitudinal sides of the platens and the laterally adjacent interior surface of the shell contacted tightly by these sides. This condition may still obtain despite the employment with the platens of the novel arrangement and action of the powerful hydraulic platen actuators presently contemplated. If the platens are moved too much out of absolute alignment with the longitudinal center line of the press, furthermore, there is considerable danger of the askew platen's jamming or binding against the side rails. The platen or the actuator thereof hence run grave risk of rupture or other failure, with obvious consequences to the production schedule.

Means are provided herein which, in combination, reduce this risk almost to negligibility. In one of the forms now contemplated, the bottom face of each platen is provided with anti-friction means which bear on the planar inner face of the floor casting fixed to the bottom of the shell-inside and they serve, in a measure, as guides or restraints, for preventing "cocking" of the platens. Special lubricating means are also provided at the junction between the sides of the platens and the shell-inside in order to further this object.

For manifold reasons, the pad and bag cannot be integral or adhered mutually facewise, yet because of the large area of the unsupported central portion of the relatively soft pad, this portion would sag downwardly into the path of the movable platens.

Suction means, such as double-face vacuum cups, are provided between, and united to, the bag and pad and prevent this sagging by holding this portion to the more rigid, reinforced bag.

There are other, perhaps less important, aspects of the presently preferred embodiment of the inventive concepts and these features and advantages will be partly made manifest, and partly become self-evident, as this disclosure proceeds.

However, it is to be understood that the essences of the invention do not reside in the structural details by which these objectives and advances are achieved, but rather in the concepts of improvement and advance as expressed configurationally in the annexed claims.

These claims define the novel and inventive features of the new press in terms of various syntheses of essential structural elements but the scope of the invention itself is restricted only by the limits set up by a just interpretation of these claims.

In order to further clarify the invention, the now-preferred one of the many constructional forms which the invention may assume is depicted in the accompanying drawings and is hereinafter described in its general structural makeup in conjunction with these drawings.

In these drawings,

Fig. 7 is an enlarged, detailed end view, on line 7—7 of Fig. 6 and sighting in the direction of the arrows, of the press body and press-rotating mechanism shown in Fig. 6;

Fig. 8 is a fragmentary, longitudinal sectional view of the press and the ends of the platen-guiding tables with the press in the position to which it has been rotated by the mechanism of Figs. 6 and 7 to facilitate servicing of the aforesaid internal components;

Fig. 9 is a fragmentary perspective and cross-sectional view of the press-components unit that occupies a removal position in the lower half of the press shell when the other press components unit has been removed to enable removal of the first-said unit;

Fig. 10 is an expanded perspective view of the unit depicted in Fig. 9;

Fig. 13 is a fragmentary longitudinal section of a portion of the press-body, showing the wedging means, indicated at the left-hand end of Fig. 2, and coacting with the roofplate and side rails for preventing lost motion, etc., between same;

Fig. 14 is a perspective view, partly in section, of one of the plurality of suction cups that hold the pad and bag in mutual union, and Fig. 15 is a bottom plan view of the bag with the suction cups in place.

Figure 1:
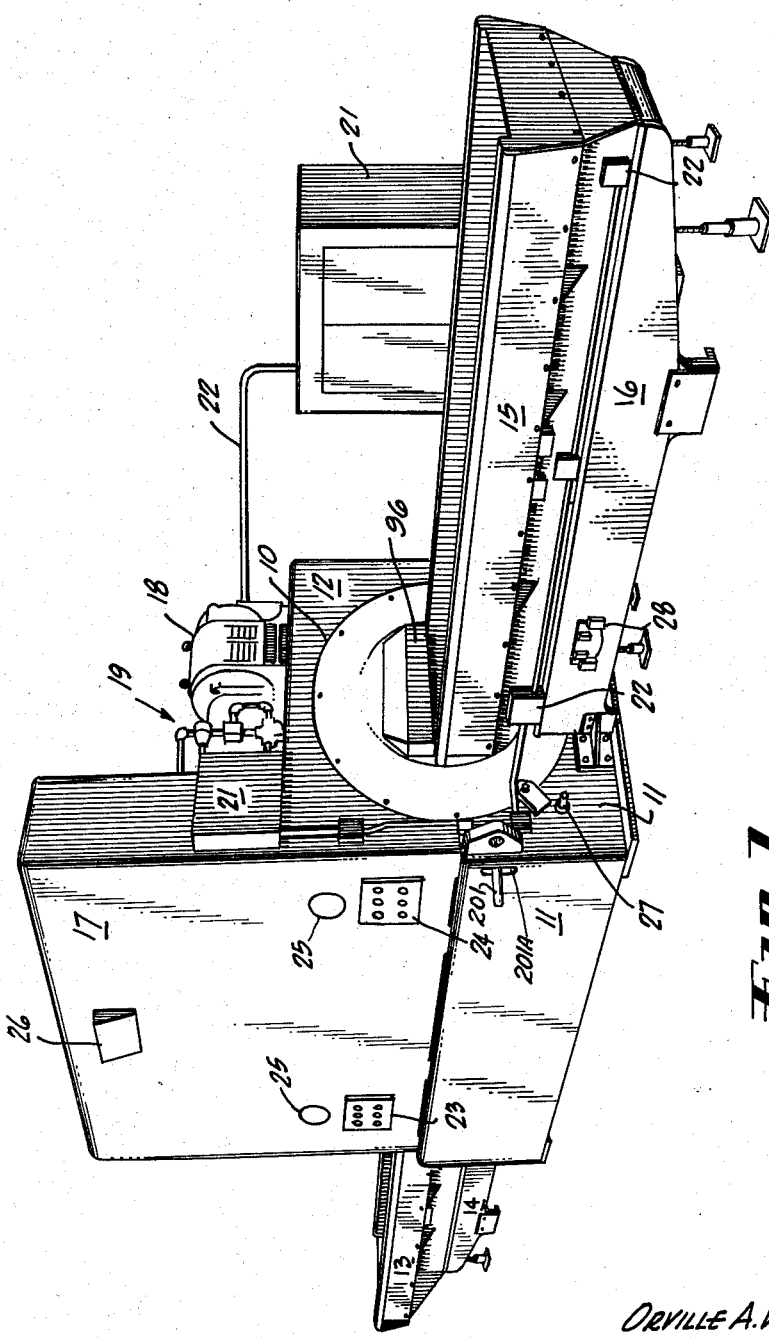
Fig. 1 is a perspective view of a complete hydraulic, diaphragm-press plant according to the present invention, showing the hydraulic-supply means, powering means, and control means, as well as the press itself.

Referring now to the sheet-metal working plant depicted in Fig. 1, the unit comprises a horizontally disposed, cylindrical press-body 10, described in detail hereinafter, the body being supported on a framework, not shown, but encased in a housing having a lower portion 11 and an upper portion 12.

As later detailed, the body 10 is open at each end for ingress and egress of means carrying the work and for servicing the inner components of the body; and to facilitate these operations, a pair of supporting and guiding tables 13 and 15 is provided. Table or platform 13 extends outwardly from the left-hand end of the press-body, as seen in this figure, and has its operating surface supported in alignment with the lower portion of the interior surface of the press body by means of a leg-bearing base 14. Table 15 is similarly arranged and supported with respect to the right-hand end of the press-body by means of base and legs 16.

A reservoir 17 is provided for the fluid for actuating the sheet-metal forming diaphragm of the press in the manner hereinafter described. The reservoir is, in the now preferred layout of the plant, arranged in "camel-back" attitude, on the supporting framework in the casing 11 and to one side of the press-body. A fluid-pressure generating motor-and-pump system 18 is arranged and connected in a substantially conventional manner to the reservoir for cycling the fluid to and from the bag, or diaphragm-actuating fluid-energized powering cell, later described. Control means 19 are provided for reversing the flow of the fluid and cycling the bag and may well take the form and arrangement shown and described in my co-pending application, Serial No. 275,893, "High Pressure Hydraulic Press," filed March 11, 1952, and now Patent No. 2,771,850.

The aforementioned work-carrying means in this particular instance take the form of a pair of opposed platens laterally movable into and out of the lower portion of the press-body on the tables 13 and 15. Hydraulic piston and cylinder means, hereinafter described, are provided for moving the platens into and out of the body and the aforesaid control means include means for controlling these movements.

The hydraulic control means, including the solenoid valves described in my co-pending application, are activated by an electrical control system the relays, switches, etc., of which are housed in a cabinet 21. An electrical conduit system 22 extends from the cabinet 21 to the solenoid valves, etc., of the hydraulic control system for the bag and platen operation and thence returns to the cabinet 21.

Operator-manipulatable, push-button type control means are provided on the front face of the reservoir and include a unit 23 composed of a plurality of pilot-lighted push buttons for activating and de-activating the left-hand platen and a similar unit 24 for the right-hand platen. A pair of electrical contact pressure-controlling switches 25 is provided and connected to the motor and pump and hydraulic control system aforementioned for varying the pressure of the pressure fluid in the bag from .0 p.s.i. up to as high as a pressure of 7500 p.s.i. or higher.

The front face of the reservoir also bears a gage 26 which is a dual indicator of the pressure and of the vacuum, respectively, occurring in the bag during the cycling thereof.

Fig. 1 also shows a portion of the means for rotating the press-unit 10 through circular arcs necessary to lower the contents of the upper half of the cylindrical press-body to a level with the tops of the tables 13 and 15, after the tables have been temporarily so lowered as to position their tops co-planar with the bottommost point of the outer periphery of the rotated roof-casting member 33. This table-lowering is hereinafter described. As shown, this portion comprises as manual-power input shaft 27 operatively connected to a power-transmitting and power-receiving unit described in connection with Fig. 7.

On the front of base 16 is stowed a set of rollers 28 for use in conjunction with the right-hand end of the roof-defining unit of the working chamber in the press-body in removing same from the press-body, as later described.

Figure 2:
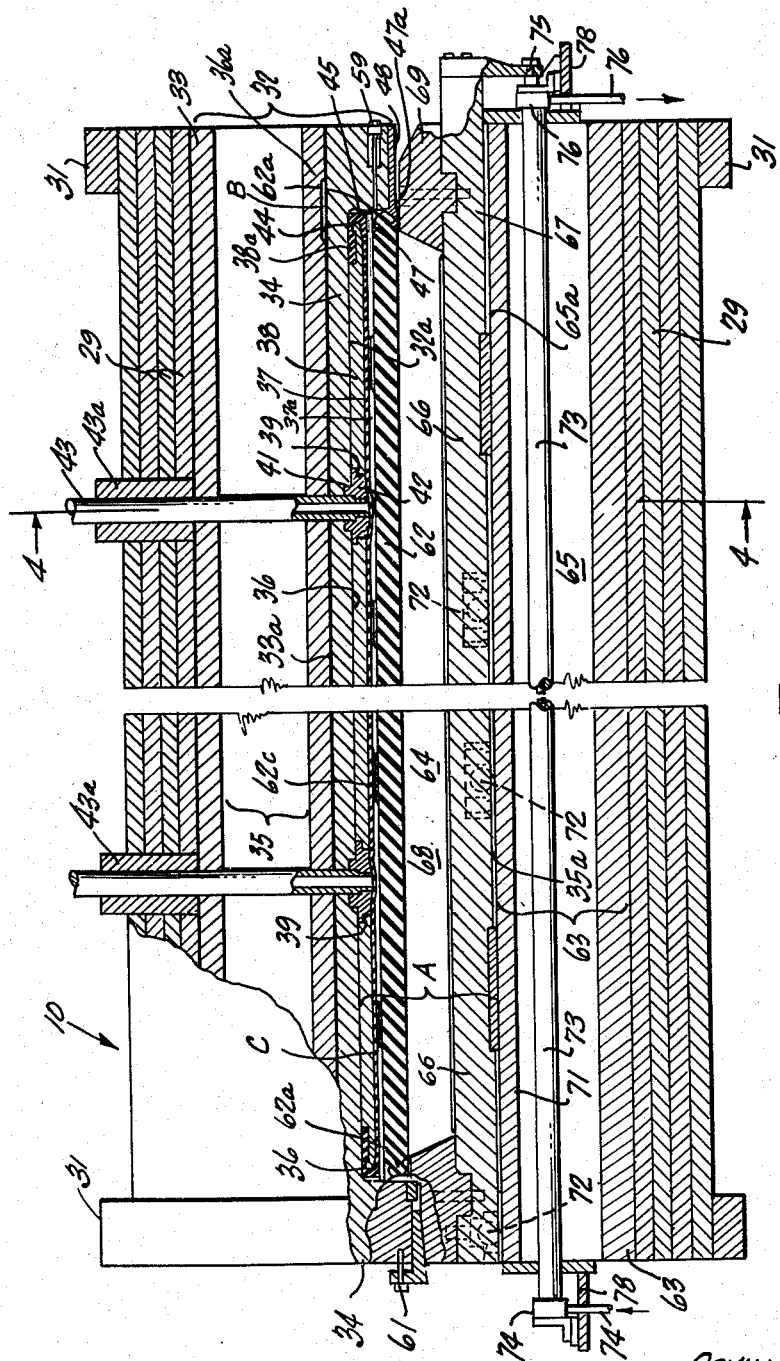
Fig. 2 is a fragmentary longitudinal and vertical central sectional view of the horizontally disposed press itself, with certain parts thereof shown in elevational, or side view.

The press-body itself is shown in its longitudinal sectional details in Fig. 2 and essentially comprises, in the manner disclosed in my aforementioned co-pending application, an exterior-shell 29 which serves mainly as an envelope and hoop-tensions taker, and a pair of segmental-cylindric, upper and lower, compressive segments or chamber-bounding bodies 32 and 63. Bodies 32 and 63 are disposed coaxially in the restraining or abutment shell 29 in substantial co-extensiveness therewith and are so spaced apart radially as to define a working-chamber A.

The mutually confronting segmental-cylindric body portion 32 and 63 each have a maximum dimension in the direction of the vertical diameter of the press-body, that is, in the direction of confrontation of the bodies, predeterminedly much less than one-half the diameter of the press body. In fact, the perpendicular dropped from the center point of the inner, rectilinear chord-line of each to the opposite point on the arcuate periphery thereof, is sufficiently short to provide a working chamber A which has a height considerably greater, for a given diameter of press-body, than was obtainable in my previous press.

By virtue of this same feature of internal arrangement and proportioning of parts, the width of the working-chamber for a given diameter of press-body is also appreciably increased over that achievable in my previous press. Since the bodies 32 and 63 terminate, radially, considerably short of the center of the shell and there take the form of planeal surfaces, the side rails 79, contrary to the case in my aforementioned press, laterally abut directly against the interior surface of the shell. If desired, they could be "inset" into the shell; or the sides of the platens could be curved to the radius of the shell and directly fitted against the shell inside, without side-rails, although it is preferable, of course to employ side rails. In either event, they leave a lateral space therebetween which permits the use of a platen much wider than that employable in my previous press of the same diameter.

The present pad instead of being partially mounted at its upper edges in the upper segmental-cylindric body, has this portion engaged by the clamps 54 of the bag, which clamps are bolted to the shell. The bag hence can assume a width, for a given shell-diameter, which is considerably greater than that aforesaid. A more powerful bag can hence be employed, in conjunction with higher pressures of the pressure-fluid. In fact, the pressure employable is limited only by the ability of the bag to withstand the expansive forces necessary to first force it into all the cavities in the upper part of the working-chamber before it begins to press the pad downwardly against and around the work. Pressures as high as 25,000 p.s.i. are contemplated for use in the present press.

The shell 29 preferably takes the form of a radially laminated hollow cylinder of steel, the laminations 29a being concentric and each being tightly wrapped around the next inner layer and welded in place along a line generally parallel to the axis of the cylinder. The laminations may alternatively be helically wound, alternate laminations being wound in opposite directions and so united as to form an integer. Under localized, internally applied and outwardly directed expansive forces, such as those generated by the excessive expansion of the bag and the displacement of the pad, this laminated shell, in either form will, if it "fails" at all, fail somewhat in the manner of safety glass and the fragments thereof will yield outwardly while remaining mutually united and integrated, somewhat in the manner of the body of an exploded firecracker. Danger to personnel and surrounding apparatus from flying shell-fragments, if perchance the pressure-limit should inadvertently be exceeded, is consequently reduced considerably below that incident to the employment of the forged or cast shells of previous practice.

In order to further minimize possibility of failure of the shell, as under localized hoop-tensions, at each end of the shell where the maximum hoop-tension occurs, a steel, or the like, hoop or circular band 31 is attached to the sub-adjacent periphery of the shell and serves well to absorb and neutralize the working-forces to which these regions are subjected.

The chamber-defining body 32, constituting the upper half of the actual press-body, consists of a segmental-cylindric member 33 disposed coaxially and coextensively in the shell 29 and removably mounted to the upper inner periphery thereof with its outer face substantially conforming to the adjacent portion of said periphery. It has an inner, or opposite, face 33a disposed or terminating, radially considerably short of the opposite portion of the inner surface of the shell.

Figure 4:
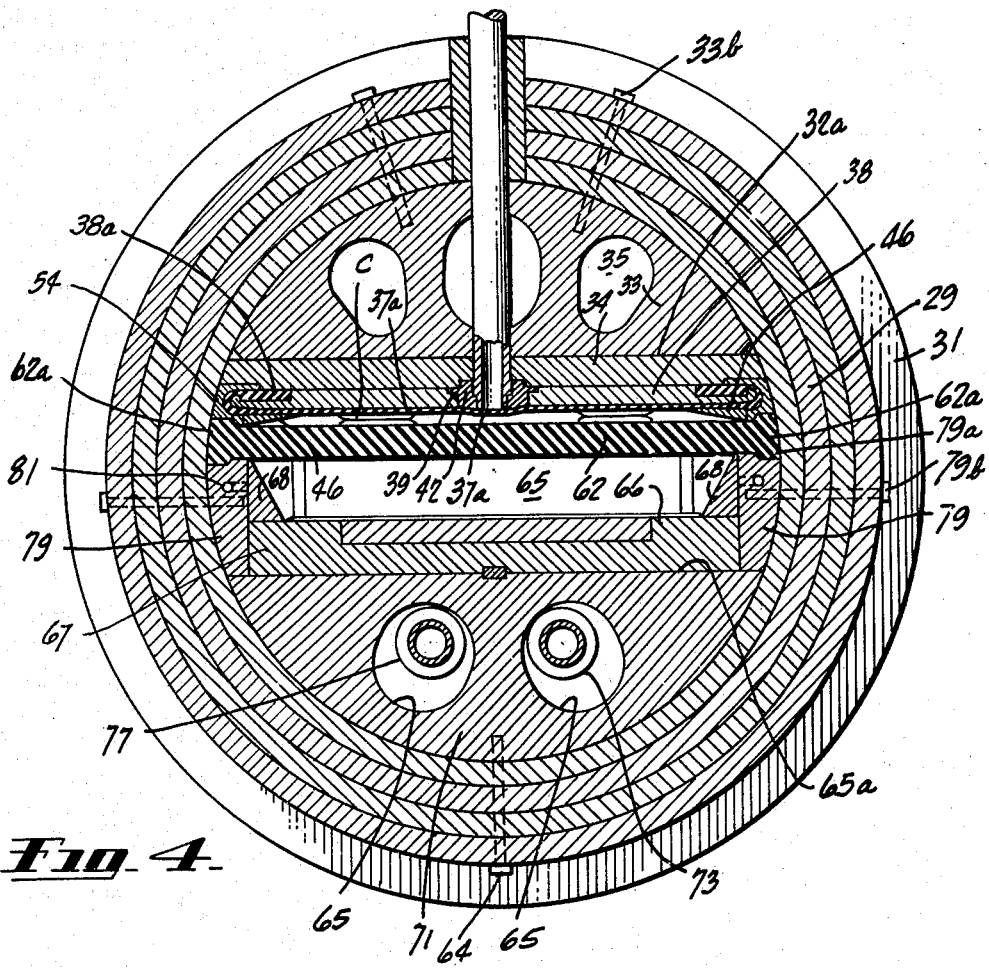
Fig. 4 is a cross-section on line 4—4 of Fig. 2, sighting in the direction of the arrows.

Facewise congruent with the said inner face of this compression and flexure taking, space filling segment, or "roof-casting," 33 is a roof plate 34. Plate 34 is preferably free of segment 33 being held thereto only by the radial compaction exerted thereon by sub-adjacent structure in the shell as later described. However, if desired, it can well be bolted to the shell in the same manner as the roof-casting. As shown in Fig. 4, the means for removably mounting the segment 33 to the shell as aforedescribed preferably consist of bolts 33b, Fig. 4, but in order to enhance the removability of member 33 other, more efficient, quickly-detachable attaching means may be employed as hereinafter made apparent.

Longitudinally extending "lightening" holes 35 may be cast into the segment 33. The aforementioned reliefs for minimizing the bending moments induced by bag expansion that tend to rupture the junction of the end walls with the body of the roof-plate 34 are indicated in Fig. 2 at B. These reliefs are merely simple cut-outs in the lower planar face of the roof-casting 33 lying directly above the maximum strain-region of plate 34 when the end-walls of 34 tend to rotate, or bend outwardly, under bag thrust. The reliefs B extend substantially fully transversely across the width of the roof-casting and extend longitudinaly of the roof-casting a distance which is coextensive with the thrust "strained" region of the roof-plate. Fig. 2 shows all that is necessary for a man skilled in this art to provide these reliefs in the manner described in the preamble to this specification by (1) elimination of the fulcrum region at this junction and (2) enabling a counter-moment to be set up in this relief-region to minimize the radial bending moment exerted on end-wall by the bag.

The lower face of plate 34 is concave, or formed with a receptacle 36, that extends substantially from end-to-end and entirely from side-to-side thereof, and in this receptacle are mounted both the diaphragm-actuating means, or pressure-fluid-energized power cell, or bag, 37, and the edges of the material-working means, or resiliently deformable, locally-flowable forming-member or, pad-diaphragm, 62. The bag is loosely (except for conduit facilities) mounted in facewise coextensive congruity with the bottom of the concavity or depression 36 and the pad is disposed in facewise coextensiveness with the lower face of the bag, the edges of the pad being respectively clamped to the plate 34 by special clamping means later described.

The bag 37 in contrast to the one disclosed in my aforesaid co-pending application, consists of an "overshoe" type rubber-like or elastomeric working-face or expansible surface 37a clamped, as detailed in Figs. 9 and 10, to the edges and upper surface of a rigid, planar liner or abutment and reaction-taking member 38, preferably of stainless steel or the like. Liner 38 is rabbeted or recessed at each edge of its upper face in order to receive the inwardly bent or folded portion of each of the margins or edges of the elastomeric element the extents of which are designated by 38a's. These folded-over marginal portions of the elastomeric member are cemented to the liner 38 at the rabbets thereof. The liner also contains a pair of longitudinally aligned, longitudinally separated apertures 39 for receiving connecting means of a pair of conduits for pressure fluid. These connecting means comprise a collar 41 threaded into the liner and bearing an internally threaded nipple portion 42, into each of which nipple portions there is fluid-tightly mounted a pressure fluid conduit 43 forming part of the aforedescribed hydraulic system. Suitable apertures are provided in the roof-casting 33 and shell 29 for passing these conduits, and a bushing 43a for each conduit is provided in the apertures in shell 29.

As detailed in Figs. 9 and 10 there is a fabric wrapper 44 enclosing each of the two opposite longitudinal sides of the rectangular bag-unit serving, when cemented or otherwise adhered to the rubber, to provide a protection for the rubber against the hard metallic anti-extrusion shims 56 and 57, later described. An elongate wedge-shaped rigid metallic plate 46 is disposed on the lower face of each of the longitudinal edges of the rectangular bag between same and the pad and serves to space the adjacent edges of the bag and pad.

Fig. 2 also depicts the clamping means for resiliently anchoring the ends of the pad. These means, substantially as in my copending application, comprise an upper, "floating" jaw 47 and a lower, resiliently positioned jaw 47a having a spring-tongue plate 48 attached to the super-adjacent surface of the two end-openings in the shell. The jaws engage the beaded ends of the pad in the manner aforedescribed and operate for the purposes already explained in said application. The upper clamp jaw may be fixed in place by means of bolts 59 passing through suitable apertures in roof-plate 34.

Anti-extrusion means are provided for inhibiting forced-flow of the rubbery components of the bag and pad out through the crevices inevitably existing between abutted metallic parts as herein. As shown in Figs. 9 and 10, these means include tri-furcated corner-sealing fillets 49 interposed between the ends of the bead and lower clamp jaw at each of the ends of the pad; the adjacent end-face of the receptacle in the roof plate and the sub-adjacent end-gate of the platens, later described, resting on said end-gates. These fillets serve to prevent endwise extrusion of the pad-ends, and to prevent similar extrusion of the bag-ends, another fillet 51 is provided between each end of the bag-and-clamp unit and the adjacent vertical end-face of the depression in the roof plate. Fillet 51 is of a generally curvilinear outline, somewhat resembling that of a wide, short-armed horseshoe and is designated by the latter noun. Fillets 51 have their concavities filled by the upper and lower clamp jaws.

Rabbeted with the concavity of the horseshoe fillet is a spacer plate 52 of generally wedge-shaped cross-section and, extending across the end-edges of the bag and pad and lying on the upper clamp jaw between these edges, serves as a filler and spacer.

The lower face each of the ends of the roof plate 34 is concaved or indented as at 53 to provide a seat for the attachment therein of the resiliently mounted plate 48 of the lower clamp jaws 47a, which jaws also serve to support, in a measure, the superimposed fillet and spacer assembly, at least sufficiently to relieve the edges of the soft rubber bag and pad of gravity loads.

As also shown by Figs. 9 and 10, the longitudinal edges of the bag are anchored in place by means of longitudinally sectionalized and end abutted side-clamps, rails, or "removable grooves" 54 laterally interposed between the adjacent interior surface of the shell and radially interposed between the upper longitudinal bead on the pad and a longitudinal recess 55 in the longitudinal edge of the roof plate 34. An anti-extrusion shim or fillet 56 is disposed in lengthwise attitude between the lower inner face of clamp 54 and the sub-adjacent face of the bag-edge fitting into each rail or clamp 54. A splice-cover, or anti-extrusion shim 57 is provided at each of the joints occurring between the abutting ends of each pair of longitudinally sectionalized rails 54, and serve to inhibit extrusion of the bag laterally through these otherwise open gaps.

As indicated, the pad 62 is oblong-rectangular and is composed of a rubbery or elastomeric material which is fairly soft in its unstressed condition. As also indicated, it includes full-length double-headed beading 62a running along each of the longer edges of the oblong, and shorter, double-headed beads 62b at each end-edge or shorter side of the oblong, the latter being less than full-length and terminating, short of the adjacent corners of the pad so as to leave planar corner portions of the pad thereat. As also indicated, although the pad may be relatively soft, the double-beading of these edges stiffens them laterally sufficiently to enable the respective clamps and rails to firmly hold the peripheral margin of the pad immobile in its initial position when the bag is "inflated," thereby to enable compressive and tensile displacement downwardly of the central, or interior portion, only of the pad and into forming engagement with the sheet-material with consequent thinning and relative hardening of this portion, which, as premised, is also locally flowable. As a consequence, the metal-forming action of the pad is so altered from that of previous such apparatus that the principle may be employed, for the first time known to me, in forming sheet-metal into undercut form-blocks and into "multiple" form-blocks by the use of bag-and-pad type forming means.

Means shown in Figs. 2, 4, 14 and 15 as vacuum cups C (later particularized) are provided between the expansible face of the bag and the adjacent face of the pad for returning the unsupported, soft centerward portion of the pad, which sometimes sags, to its original position after it has been deflected downwardly by the internally expandible bag so that the platens may be removed from the press-body without interference with this sagging centerward portion.

Figure 5:
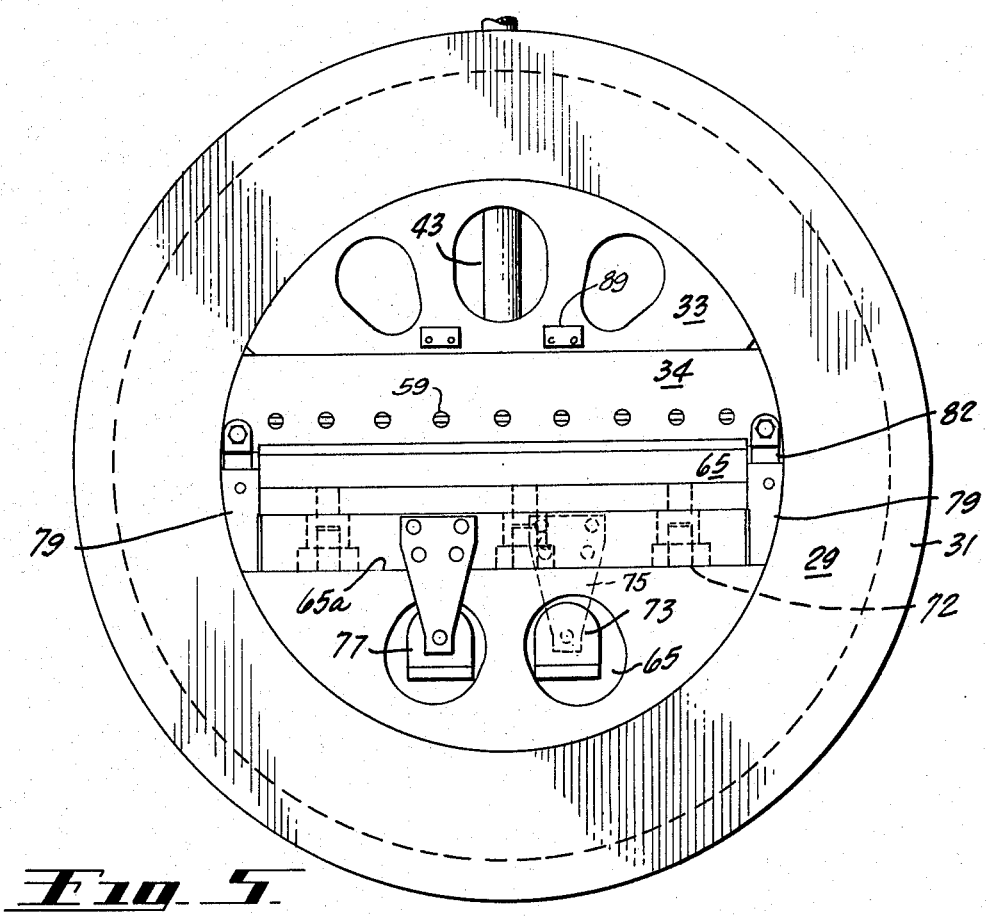
Fig. 5 is an elevational view of the left-hand end of the press per se.

The complementary chamber-defining segment 63 for primarily taking compressive and flexural forces but also serving as a radial-space-filling circumferential force taking member, and constituting the lower half of the actual press-body, also consists, as shown in Fig. 4, of a segmental-cylindric casting disposed coaxially and coextensively in the shell 29. It is removably mounted to the lower inner periphery of the shell by means of removable fasteners such as the anchoring bolts 64. Casting 63 includes two or more longitudinally extending lightening holes 65, and an upwardly disposed inner face 65a. On this face 65a as shown in Figs. 2, 5 and 4 in particular, there rests and moves a pair of platens 66 or other means for carrying the sheet-material mounted on former-means.

Figure 3:
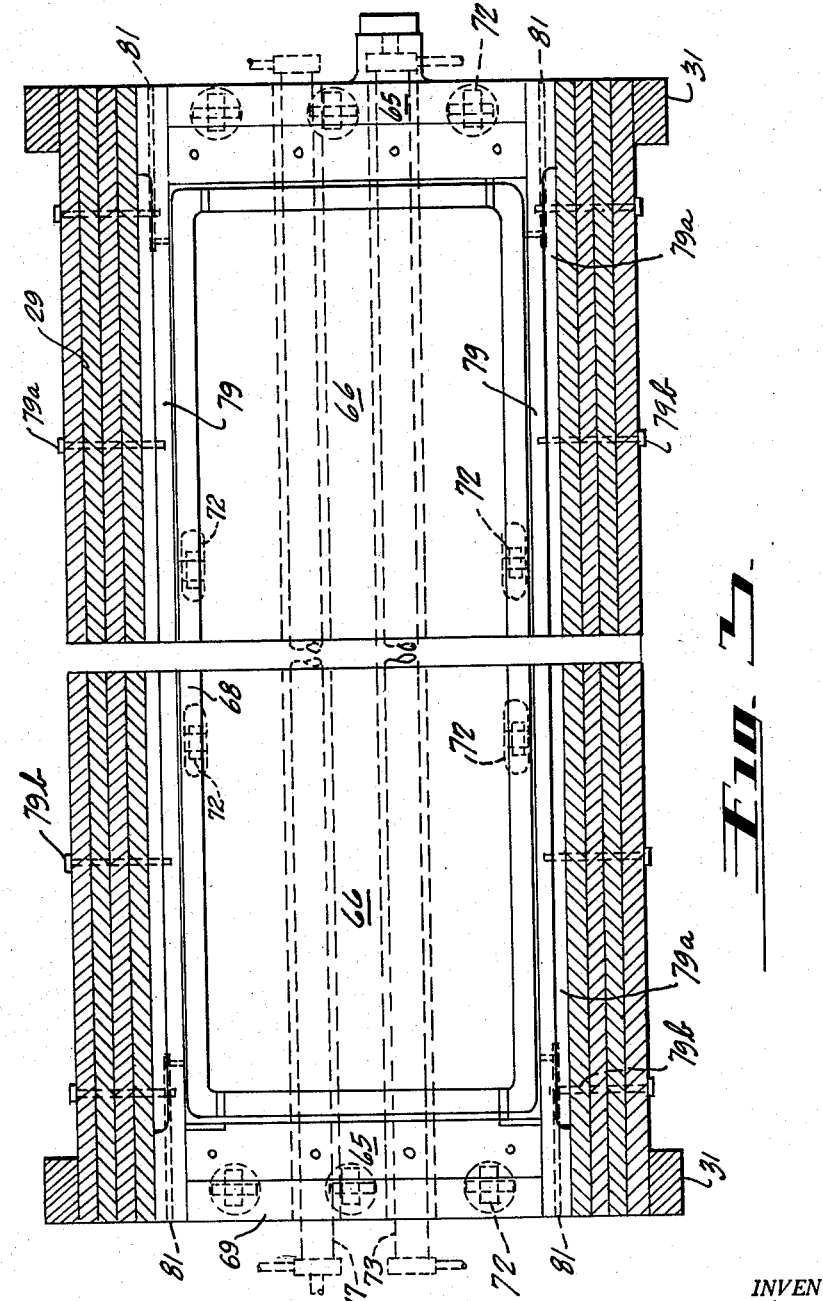
Fig. 3 is a fragmentary longitudinal and horizontal, central section of the horizontally disposed press, with certain parts thereof shown in plan.

Each platen includes a floor or bottom 67 bounded on its upper face at its longer sides by a platen-side rail 68, which, as shown in planform in Fig. 3, is mounted for resilient lateral inward movement to take up the "finite clearances" between the platens' sides and the adjacent sides of the rails, substantially as described in my co-pending application.

Platen tail-gates, or end-gates, 69 are disposed transversely of each end of each oblong platen, are downwardly bevelled on their inner faces and are removably mounted to the platen bottom by a mortise and tenon or like arrangement as shown in Fig. 2.

As shown in Fig. 3, each platen bears a plurality of anti-friction roller-assemblies 72, some of these roller-assemblies being disposed along the longer sides of the platens in longitudinally spaced relationship and others being disposed along the shorter sides of the platens in mutually transversely spaced relationship. All the rollers extend lengthwise of the body and all bear on or run on the sub-adjacent face of the floor-casting. The assemblies are resilient enough to allow the platens to bear directly on the floor casting when metal-forming loads are applied. Lateral movements of the platens into and out of the working chamber are thus facilitated and jamming of the platens between the side walls or between the floor-casting face 35a and the pendulous pad is obviated.

Mounted in lengthwise relationship with each of the two lightening holes 65 in the floor casting is a hydraulic cylinder-and-piston unit for operating the platens. The cylinder unit 73, Fig. 2, is provided for operating the right-hand platen and the cylinder-unit 77, Figs. 4 and 5, is similarly provided for operating the left hand platen. For energizing unit 73 there is provided a pressure-fluid inlet and outlet assembly 74, Fig. 2, to supply fluid to the one end of unit 73, the fluid on the opposite side of the piston exiting through similar unit 76, Fig. 2, to move the platen to the right. To return the platen into the press, the direction of flow is reversed. The end of the piston rod of Fig. 2 which lies opposite the piston head is connected by a bracket unit 75 to the super-adjacent end of the right-hand platen. Brackets 78 secure cylinder unit 73 to the floor casting at its opposite ends. For cylinder-unit 77 for operating the left-hand platen there are of course provided, but not shown, similar fluid inlet and outlet assemblies, and a connecting bracket connecting the outer end of the left-hand platen to the end of its activating piston-rod.

It will be understood that only one platen is inside the press at one time, the other one being outside on the loading table at this time.

Between the longer sides of each platen and the adjacent portion of the interior surface of the shell 29, there is disposed an elongate side-rail 79. Each rail 79 is substantially oblong in cross-section, and each is coextensive with the shell and with the abutted platens therein. These rails serve the purpose, among others, of supporting the unit or assembly consisting of the roof plate, bag, pad and bag-clamping rails 54, taking the gravity loads exerted thereon. The upper surface of each rail 79 bears, at its outer edge, a longitudinally extending groove 79a cross-sectionally contoured to receive and seat the longitudinal bead on the longer edges of the super-adjacent pad or diaphragm member. Suitable detachable attaching means, such as bolts 79b pass through the shell 29 to removably anchor the side rails 79 thereto. If desired, suitable lubricant-conducting channels 81 may be provided, as shown in Fig. 3, to introduce lubricant between the platen sides and the rails 79, further facilitating removal of both the platens and the side rails.

It is a feature of the invention that the upper half of the body-proper, consisting of the roof-casting, roof plate, bag, pad, and the anchoring and filleting and spacing means from the latter can be easily, quickly and substantially frictionlessly removed from the shell without the aid of supporting jacks for holding and lowering the gravity-loaded unit after unbolting thereof from the shell. Broadly, this is accomplished by arranging for removing this unit lengthwise from the shell while resting frictionlessly on the lower inner periphery of the shell. In order to realize this latter possibility, means are provided for reversing the position of the roof unit, or upper half of the body-proper, while the latter is still fixed in place to the upper inner periphery of the shell. To this end, means are provided at each end of the roof casting for rolling it lengthwise of the shell while resting on the inner surface thereof, together with means for rotating the entire press body about its longitudinal axis and stopping it after it has rotated 180°, it being understood of course that these means also enable the return rotation of the body to its original position for operation of the press.

Figure 6:
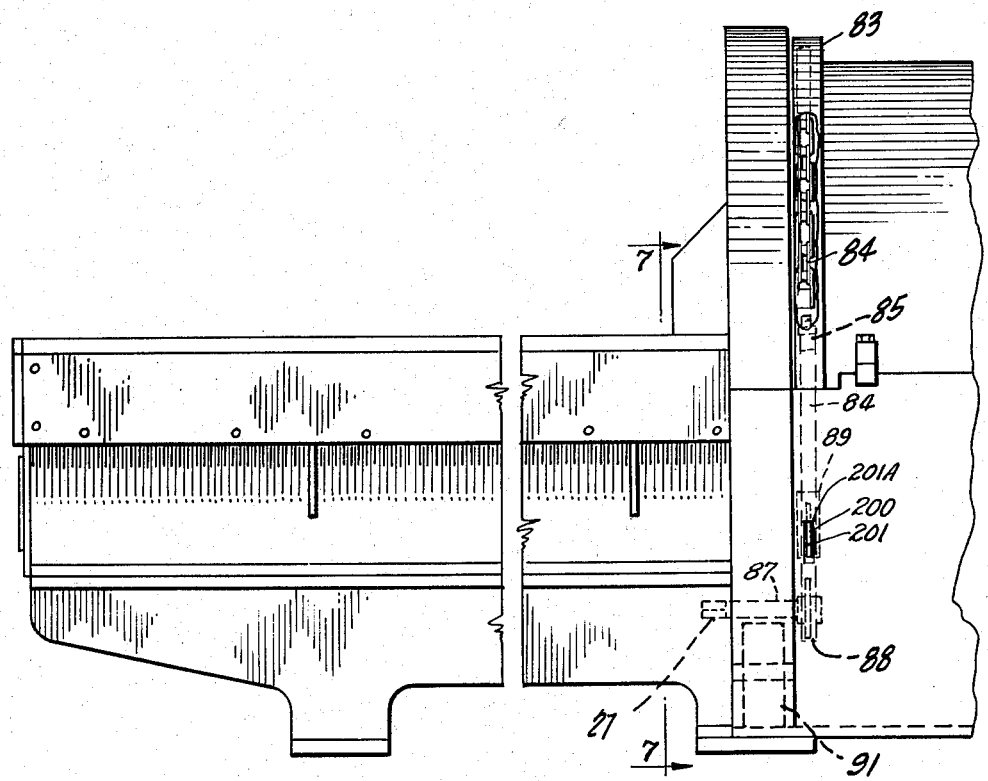
Fig. 6 is a fragmentary side view of the left-hand end of the plant shown in Fig. 1, illustrating the mechanism for rotating the press-body to that position which facilitates servicing the internal components thereof.

The means for rotating the press-body, as and for the purposes aforementioned, comprise, as shown in Figures 6 and 7, a chain mounting or guard which may take the form of a hollow annulus, 83, that at least partially encircles the shell at the one end thereof. In the mounting 83 is disposed a sprocket-chain 84 which has one of its ends, 85, anchored to the sub-adjacent portion of the shell, the remainder of the chain being loosely enough draped around the shell to leave a bight of slack protruding laterally from the shell at the lower left-hand-portion thereof as shown in Figure 7. Although the one end-portion of the chain is suitably anchored to the shell, the other end bears a take-up means 86, such as a take-up bolt, which is manipulatable to remove excess slack from the chain. The slab-sided crank-handle 27 continues longitudinally inwardly of the apparatus in the form of an idler shaft 87, which, adjacent the bight of the chain, bears a sprocket drive wheel 88.

A pawl-unit 200 is rotatably mounted adjacent the vertical "run" of the chain-bight and essentially comprises a bell-crank having a detent end normally spring biased against the chain, the pawl including a handle 201 for releasing same from the chain. A back-up plate 89 is disposed in vertical attitude adjacent the side of the chain opposite to that of the pawl in order to guide the chain vertically in proper rectilinearity and to prevent its being deflected out of alignment, and binding or "kinking," under the pawl action.

The handle 201 is elongate and protrudes through a vertically extending slot therefor, 201A. Slot 201A is formed in the sheet metal casing 11 in correspondence with the end-portion of the handle 201 and has a height equal to the handle's vertical travel and a width only slightly greater than that of the handle 201, as will be apprehended.

Press body supporting rollers 91 are provided alongside each end of the body and beneath same, being adapted to provide the necessary rolling-support for the rotating body.

Figure 11:
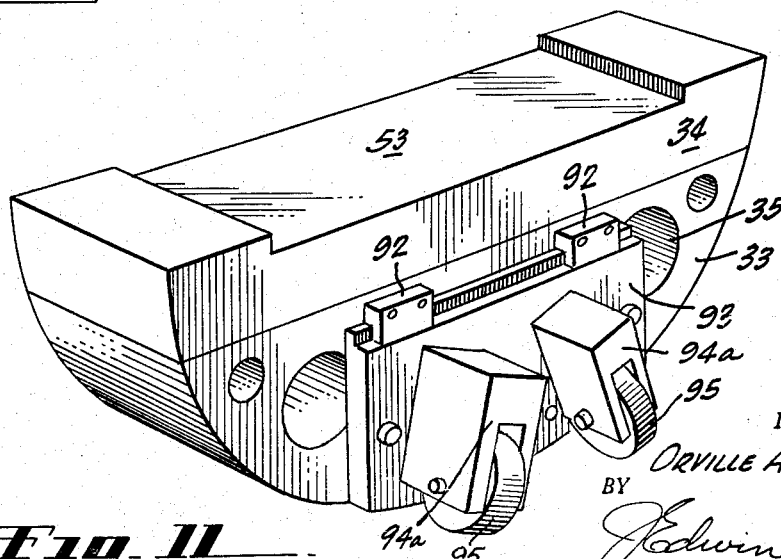
Fig. 11 is a fragmentary perspective view of the left hand end portion of the unit shown fragmentarily in Fig. 9 and occupying the same attitude as in Fig. 9.
Figure 12:
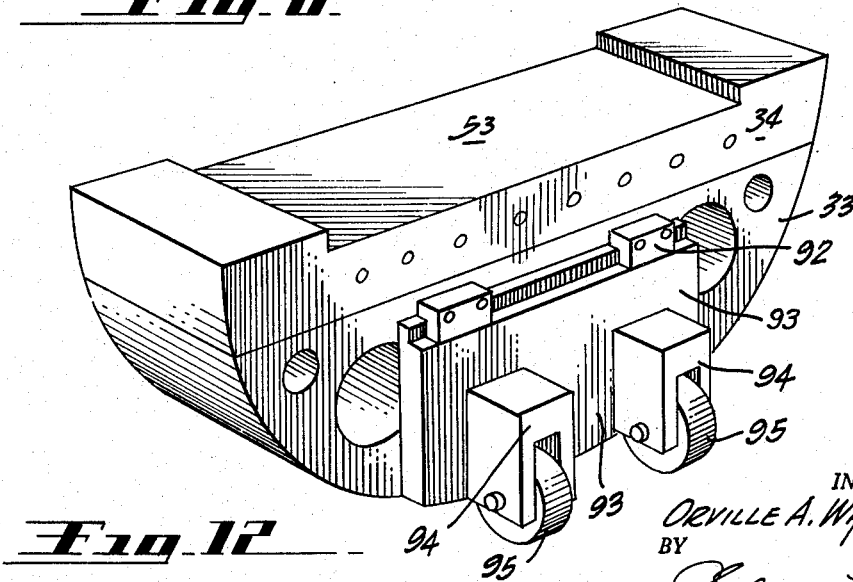
Fig. 12 is a similar view of the right-hand end portion of the same unit, in the same attitude.

The roof casting 33 bears, on each end-face thereof, as shown in Figs. 11 and 12, a pair of clamping-brackets 92 which brackets are adapted to seize to the end-face, the mounting plates 93 for anti-friction means adapted to support the roof-unit and bag and pad, in inverted position as they are removed endwise, as a unit, from the right-hand end of the rotated shell. The left-hand end of the unit is then resting on the lower inner periphery of the shell until its left-hand clears out of the shell.

The aforementioned anti-friction means differ at each of the opposite ends of the segmental-cylindric member 33, although the mounting means therefor are the same. At the right-hand end of member 33, the anti-friction means consist of a pair of brackets 94 mounted to the face of the plate 93 in laterally spaced relationship with their longitudinal axes extending vertically and in mutual parallelism. The lower ends of the brackets are bifurcated and a roller 95 is mounted in each bifurcation to extend vertically of the bracket with a certain portion of its lower edge projecting beyond the arcuate periphery of member 33.

At the left-hand end of member 33, the anti-friction means consist of a pair of brackets 94a mounted to the face of plate 93 in laterally spaced relationship with their longitudinal axes angling upwardly towards each other so as to define therebetween an acute angle that subtends an arc equal to the arc on the shell's interior surface comprised between the two contact-points of the rollers. By these means, the left-hand end of member 33, as it is pulled through the shell, is rollingly supported on the interior surface of the shell without binding or jamming, while the right-hand end of member 33 is rollingly supported on the table 15.

The rollers 95 project a slight distance below the lowermost point of the arcuate periphery of the roof-casting in order to support this end of the casting during its removal.

In order to protect the operator's hands from damage during operation of the press, as by inadvertent insertion thereof downwardly and into the end-opening of the press while the machine is operating, a hood or the like 96 is removably mounted to the end-face of the roof casting.

In order to facilitate endwise removal of the roof unit, bag, pad and plate, it is as aforementioned, contemplated that the press-body be rotated 180° and thereafter the roof-unit be unbolted, rails 79 be removed endwise and thereafter that the roof-unit, etc., be rolled endwise out of the body and onto the right-hand table 15, the guard 96 having first been removed. In the form of table shown in Figure 1 as merely illustrative or representational, it obviously will be necessary to first unfasten and raise 15 and remove it. The top surface of unit 16 is planar and constitutes the run-out support for the roof-unit, which rolls along it by means of the rollers aforesaid. Alternatively, the legs on member 16 could be separately attached, so that by removal of the legs and lowering of members 15 and 16 to rest on the floor, the runout surface of member 15 would be at the proper height to receive the roof casting. It will also be necessary to unfasten the left-hand platen run out table and back it out of the way so that rollers 93 and the outside support plate therefor, Figure 8, can be attached to the left-hand end of the (rotated) roof-unit, the rollers 95 having already been attached to the right hand end of the roof-casting.

By "resting on the floor" is meant supported by the floor and resting on jacks and lying in juxtaposition to the floor. To lower them into such adjacency with the floor, conventional, or telescoping jacks are interposed between the edges of 16 and the floor, as shown in Fig. 1.

As indicated in the left-hand end of Fig. 2 and detailed in Figs. 5 and 13, a wedging-means 61 is provided for exerting radially opposite forces on the roof plate ends and the ends of the rails 79 so as to remove any play or lost-motion developed between the roof plate 34 and each of the sub-adjacent side rails 79 by the radially acting expansive forces generated by the bag expansion, etc., during the pressure cycle of the press. These wedge means comprise, at each of the two opposite ends of the press, a pair of units, one unit of each pair being disposed to each side of the end of the working chamber, as best seen in Fig. 5. Each unit, 97, as shown in Fig. 13, comprises a downwardly sloping surface 98 on the inner face of the left-hand end of each side rail 79 and a trapezoidal-section wedge-block 99 contoured to fit longitudinally in the gap 97 between surface 98 and the super-adjacent surface of the roof plate 34. A bolt 101 passes through the arm 102 of the wedge-unit into the roof plate end and is employable to "reach" the wedge into the gap between the roof plate and the side rail.

As the wedging action raises the roof plate, the trifurcated fillets 49 disposed at each of the four-corners of the cavity in the roof-plate would be left without sufficient end-abutment surface, and to meet this situation a block 103 is seated in a cavity 104 in each of the inner corners of the roof plate and adjusted by means of a bolt 100. Block 103 projects below the roof plate into the gap thereat a distance sufficient to abut the fillet throughout the maximum vertical travel of the roof plate.

The aforementioned vacuum cups C are detailed in Figs. 14 and 15 as consisting of double-faced, rubbery, suction-disks of relatively large diameter. The two faces 104a of the cup are defined on the opposite side of the rubber web 105 by rubber flanges 106. Pressural application of the one face to the adjacent face of the bag, followed by pressural application of the upper face of the pad to the adjacent cup-face, will result in creation of sufficient vacuum in both cup-faces to enable the outside air pressure, and the cups, to hold the pad and bag together, thus precluding the sagging of the centerward portion of the pad into the path of the platens.

A cycle of operation of the plant commences with both platens outside the press-body. The one platen may then be undergoing unloading while the other platen is being loaded with sheet material rested upon form-blocks.

The loaded platen is then moved into the press by its hydraulic actuator, 73 or 77 when the proper one of the button switches in one of the groups 24 or 23 is depressed by the attendant.

With the proper platen now properly positioned in the working chamber and coextensive therewith, the proper one of the bag-pressurizing switches 25 is closed in order to cycle the feed and exhaust of the pressure-fluid through the bag, thereby to pressurally urge the pad downwardly and formingly against the sheet-material on the form-blocks, the exhausting of the fluid from the bag also effecting retraction of the vacuum-cupped pad into a position overlying the retraction path of the platen.

In the event that it becomes necessary to replace or repair the pad or bag, they may be removed, still in place in the upper chamber-defining unit 32, in the manner described hereinabove by virtue of the novel mounting of unit 32 to the shell and the improved mounting of the bag and pad in unit 32, in conjunction with the novel means for rotating the press body to position unit 32 coplaneally adjacent the tables 13 and 15. Thereafter, the unit 32 can be readily slid lengthwise out of the press-body and onto a table with the pad and bag uppermost for ease of access.

Although certain structural elements employed in the construction of the apparatus have been described in specific terms and the compositions and arrangements thereof have been detailed with reference to a certain one of the many ways thereof provided by the inventive concepts, it is to be understood that these specific descriptions are presented, by way of example only, and merely in order to clarify one of the plurality of embodiments which the present invention may assume. The actual scope of the invention, however, is limited only by that of the subjoined claims.

I claim:

1. A diaphragm-type hydraulic press, comprising: an elongate tubular shell open in at least one end-portion thereof; first and second cylindric abutment-units mounted in said shell in concentricity with the longitudinal axis of the latter with the outer surface of each of said units contacting the inner surface of the shell, the inner mutually confronting faces of said units being spaced radially apart so as to partially define a substantially rectangular reaction chamber within the shell; a rectangular, elastomeric powering cell and a rectangular, elastomeric diaphragm mounted to the inner face-portion of the first abutment unit; a pair of laterally spaced rails extending longitudinally of the shell and directly contacting the bare inner cylindric surface of said shell; interengaging anchoring members on the edges of the diaphragm and on the adjacent portions of said rails; and barrier-type sealing means for preventing powered extrusion of said elastomeric cell and diaphragm outwardly of the shell and past the first abutment-unit, said barrier means comprising a generally horse-shoe shaped plate-like member and a shim-plate, said shim-plate fitting rectangularly into the inner curve of the horse-shoe shaped member, said barrier means being in effect substantially unitary and being interposed between the cell-and-diaphragm ends and the adjacent surfaces of the first abutment-unit; the bight, or inner curve, of the horse-shoe embracing the aforesaid interengaging members, whereby said horseshoe-and-shim unit seals the ends of the cell-and-diaphragm to the shell so as to prevent extrusion of said elastomeric ends.

2. A diaphragm type hydraulic press, comprising: a tubular shell open in at least one end; first and second, upper and lower, substantially hemi-cylindric abutment units in said shell in concentricity with the longitudinal axis of the latter, the outer peripheries of said units contacting the shell's inner surface and the inner, mutually confronting faces of said units being spaced radially apart so as to partially define a substantially rectangular reaction chamber within the shell; a pair of laterally spaced longitudinally extending rails directly contacting the bare inner cylindric surface of said shell; a rectangular elastomeric powering cell mounted to the inner face of the first abutment unit and a rectangular elastomeric diaphragm having its longitudinal edges supported by said rails; and barrier means disposed between the corners of the cell and the diaphragm and the adjacent surfaces on the first abutment unit for preventing powered extrusion of said elastomeric corners, said extrusion-preventing means including a rigid trifurcated fillet interposed in each of the mating groups constituted by the superposed corners of the cell and diaphragm unit and the surfaces of the first abutment unit.

3. In a diaphragm type hydraulic press: a hollow shell open in at least one end; an abutment unit mounted to the upper portion of the inner surface of said shell; a substantially planar facing plate and diaphragm seating member mounted facewise and coextensively to the inner face of said abutment unit; side-rails extending longitudinally of the shell's inside and arranged sub-adjacent said facing plate member so as to support same against said abutment unit with an indeterminate amount of lost motion therebetween; and means interposed between the ends of the side-rails and the superadjacent ends of the facing plate member for pre-stressing said facing plate-member with respect to said rails so as to stabilize the facing plate-member against unbalanced loading and fretting thereof originating in press-operational stresses.

4. In a diaphragm type hydraulic press: a hollow shell open in at least one end; an abutment-unit mounted to the upper portion of the inner surface of said shell; a substantially planar facing plate and diaphragm seating member mounted facewise and coextensively to the inner face of said abutment unit; side rails extending longitudinally of the shell's inside and arranged sub-adjacent said facing plate so as to support same against said abutment unit with an indeterminate amount of lost motion therebetween; means interposed between the ends of the side rails and the superadjacent ends of the facing plate for prestressing same with respect to said rails so as to stabilize the facing plate against unbalanced loading and fretting thereof originating in press-operational stresses; and adjustment means carried by the outer end of said facing plate and adjustably engaging the aforesaid prestressing means so as to enable such adjustments thereof as effect variation of the prestressing in accordance with the amount of lost-motion subsisting as between said facing plate and said rails.

5. A hydraulic press comprising: an elongated body having upper and lower body portions forming between them an elongate working chamber open at least at one end; an elongate platen movable into and out of said working chamber and adapted to carry work to be formed into an operating position; an elongate passageway formed in said lower body portion and extending substantially parallel to the axis of said body; a platen actuating device including a cylinder mounted in said passageway and a piston rod slidably extensible from said cylinder; and means attaching the free end of said piston rod to an end of said platen to move said platen in and out of the working chamber.

6. A hydraulic press comprising: an elongate body having upper and lower body portions forming between them an elongate working chamber open to both ends of the body; a pair of elongate platens movable into and out of said working chamber and each being of substantially the same length as the working chamber and adapted to carry work to be formed into an operating position; a pair of elongate passageways formed in said lower body portion and extending from end to end thereof substantially parallel to the axis of said body; a platen actuating device including a cylinder mounted in each of said passageways and a piston rod slidably extensible from each of said cylinders in outwardly opposite directions; and means attaching the free end of each of said piston rods to an end of its respective platen; whereby one piston rod may move its platen out of said chamber and the other may move its piston rod into said chamber.

References Cited in the file of this patent

UNITED STATES PATENTS

| | | |
|---|---|---|
| 1,547,871 | Grunberg | July 28, 1925 |
| 2,317,440 | Cannon | Apr. 27, 1943 |
| 2,337,247 | Kepler | Dec. 21, 1943 |
| 2,375,599 | Walton | May 8, 1945 |
| 2,418,393 | Bridgens | Apr. 1, 1947 |
| 2,480,369 | Jasper | Aug. 30, 1949 |
| 2,550,672 | Chyba | May 1, 1951 |
| 2,576,085 | Vivian | Nov. 20, 1951 |
| 2,677,171 | Ferrand | May 4, 1954 |
| 2,696,183 | Chyba | Dec. 7, 1954 |
| 2,741,205 | Paulton | Apr. 10, 1956 |
| 2,771,850 | Wheelon | Nov. 27, 1956 |